United States Patent [19]
Bachmann et al.

[11] 3,962,251
[45] June 8, 1976

[54] PREPARATION OF FLAVANTHRONE PIGMENT

[75] Inventors: William E. Bachmann, North Haledon; Thomas R. Flatt, Ridgewood, both of N.J.

[73] Assignee: Allied Chemical Corporation, New York, N.Y.

[22] Filed: Apr. 24, 1975

[21] Appl. No.: 571,164

Related U.S. Application Data

[62] Division of Ser. No. 507,830, Sept. 20, 1974, abandoned, which is a division of Ser. No. 370,241, June 15, 1973, Pat. No. 3,898,233.

[52] U.S. Cl................................. 260/273; 260/673
[51] Int. Cl.².......................................... C09B 5/22
[58] Field of Search..................... 260/273

[56] References Cited
UNITED STATES PATENTS 2,611,771  9/1952  Marnon .............................. 260/673
3,660,407  5/1972  Kay et al............................. 260/673

*Primary Examiner*—Paul M. Coughlan, Jr
*Attorney, Agent, or Firm*—Anthony J. Stewart; Jay P. Friedenson

[57] ABSTRACT

A process for producing a new crystalline polymorphic form of flavanthrone is disclosed which comprises treating crude flavanthrone with nitric acid. This new form exhibits only one prominent X-ray diffraction peak between 7.00 and 8.00 dA and only two prominent peaks between 3.30 and 3.75 dA. In contrast to the known form of flavanthrone, the new form exhibits desirable transparent mass tones when employed as a pigment.

1 Claim, No Drawings

PREPARATION OF FLAVANTHRONE PIGMENT

This is a division of application Ser. No. 507,830, filed Sept. 20, 1974, now abandoned, which in turn is a divisional application of Ser. No. 370,241, filed June 15, 1973, now U.S. Pat. No. 3,898,233.

BACKGROUND OF THE INVENTION

Flavanthrone is the common name for Pigment Yellow 24 (CI 70600). Several processes are known for the production of flavanthrone including (1) treatment of 2-amino-anthraquinone with antimony pentachloride or titanium tetrachloride in nitrobenzene and (2) the Ullmann reaction on acylated 1-chloro-2-aminoanthraquinone followed by alkaline treatment. The crude flavanthrone produced by these known processes is conditioned by acid pasting, i.e., treatment with sulfuric acid and dilution with water. This results in a flavanthrone pigment in a fine state of subdivision suitable for pigment use.

Flavanthrone has a characteristic X-ray pattern exhibiting prominent peaks at about 7.34, 7.00, 3.72, 3.67, 3.52, 3.39 and 3.31 dA. "Prominent peaks" as used herein is intended to denote an intensity of 20 or more based on an intensity scale in which the highest peak is 100.

While useful for many purposes as a yellow pigment, known commercial flavanthrones have not been totally acceptable in the coloration of certain plastics and surface coatings due to the fact that they exhibit opaqueness, i.e., are not sufficiently transparent to produce the desired coloring effect.

SUMMARY OF THE INVENTION

In accordance with this invention there is provided a novel polymorphic form of flavanthrone that is reddish yellow in shade as opposed to the greener yellow of known flavanthrones. This new polymorphic flavanthrone has an X-ray diffraction pattern quite distinct from that of known flavanthrones. Specifically, the flavanthrone of this invention has only one prominent peak between 7.00 and 8.00 dA, and only two prominent peaks between 3.30 and 3.75 dA. Additionally, and most importantly, this new polymorphic flavanthrone exhibits a clean, very transparent masstone when used to color plastics and surface coatings. Thus, not only does the flavanthrone of this invention provide a surprising extension of shade ranges but quite unexpectedly, this new flavanthrone finds utility in the coloration of articles where transparency is a desired or necessary characteristic.

DETAILED DESCRIPTION OF THE INVENTION

Flavanthrone made in accordance with any of the known prior art procedures, called "crude" flavanthrone, requires an additional treatment to render it useful as a pigment. As is indicated above, traditionally this treatment has been the "acid pasting", i.e. treatment with sulfuric acid and drowning with water. It has now been found that modification of this treatment results in a new form of flavanthrone. Instead of acid pasting with sulfuric acid and drowning with water, it has been discovered that the addition of an aromatic sulfonate to the sulfuric acid results in a flavanthrone having distinct X-ray diffraction patterns, which is reddish yellow in shade and which exhibits the desired transparency when used as a pigment. Furthermore, it has been found that the use of concentrated nitric acid (specific gravity between 1.30 and 1.60) in place of the sulfuric acid of the prior art procedure likewise results in the production of the new form of flavanthrone.

The aromatic sulfonate employed in conjunction with sulfuric acid in the process of this invention is one having 6 to 10 carbon atoms and may have additional substituents such as nitro, halo, and the like. The sulfonate may be in the form of the acid or an alkali metal or ammonium salt thereof. Generally, the sulfonate is employed in amounts ranging from 4 parts to 1 part by weight based on the weight of the flavanthrone. The aromatic sulfonate may be produced in situ by adding an aromatic compound to concentrated sulfuric acid. Exemplary aromatic sulfonates which may be mentioned are:

xylene sulfonic acid,
sodium benzene sulfonate,
sodium nitro benzene sulfonate,
sodium monochloroxylene sulfonate,
toluene sulfonic acid,
benzene sulfonic acid,
ammonium chlorobenzene sulfonate,
sodium nitrotoluene sulfonate,
and the like.

The sulfuric acid employed with the aromatic sulfonate should be present in amounts of between 5 and 20 parts by weight based on the weight of the flavanthrone being treated. When nitric acid is employed alone it is generally present in an amount of between 3 and 10 parts by weight per part of flavanthrone.

Preferably, when employing sulfuric acid and an aromatic sulfonate, 8 to 12 parts of sulfuric acid are employed and 2 to 3 parts of aromatic sulfonate are employed per part of flavanthrone. Also preferably, when employing nitric acid alone, 5 to 7 parts of nitric acid are used per part of flavanthrone.

Crude flavanthrone is added to the acid, or acid mixture, with agitation and the mixture is maintained between room temperature and 80°C for about 1 to 3 hours to obtain uniform mixing. Thereafter the mass is drowned with water and ice is added to bring the temperature to between 0° and 10°C. The mass is then heated to between 90° to 100°C for 1 to 3 hours, filtered, washed, reslurried with water and an oxidizing agent (e.g., sodium hypochlorite), heated and again filtered, washed and dried.

The flavanthrone product so produced has a reddish yellow shade as opposed to the greener yellow of known flavanthrones, possesses outstanding fastness to light and has a clean, very transparent masstone. These features plus the difference in X-ray pattern indicate that the product is a new polymorphic flavanthrone.

DESCRIPTION OF PREFERRED EMBODIMENTS

The following examples are given by way of illustration only and are not to be considered limiting in any way.

EXAMPLE 1

300 parts of nitric acid (specific gravity 1.49 to 1.50) are charged to a round bottomed flask equipped with an agitator and a thermometer. 50 parts of crude flavanthrone are sprinkled in slowly with agitation at room temperature and the agitation is continued at this temperature for 1 hour after which the contents of the flask are drowned in an agitated mass comprising 2500 parts of water plus sufficient ice to maintain the temperature of the drowned mass at 5° to 10°C, until drowning is complete. The drowned mass is stirred for 1/2 hour after completion of the drowning and then heated, while agitation is continued, to 95° to 100°C for 2 hours, filtered, washed free of acid and bleed free using hot water before drying at 175°F. The yield is 49.05 parts of a reddish yellow product.

EXAMPLE 2

400 parts of sulfuric acid assaying 98.0% were charged into a round bottom flask equipped with an agitator and thermometer. 80 parts of commercial xylene were added with agitation and the mixture was heated to 65° to 70°C, held at this temperature for 1½ hours and then 40 parts of crude flavanthrone was added while maintaining agitation and temperature for a period of 2½ hours before cooling to room temperature and drowning with 2000 parts of water and sufficient ice to bring the temperature down to 0° to 5°C. After stirring at this temperature for ½ hour, the drowned mass was heated with stirring to about 93°–97°C, held for 3 hours at this temperature and thereafter filtered, washed acid free, reslurried by the addition of water and 240 parts sodium hypochlorite solution, heated for 1 hour at 95° to 98°C, filtered, washed free of hypochlorite and dried at 175°F. The yield is 37.25 parts of a reddish yelllow material.

EXAMPLE 3

350 parts of sulfuric acid (85.0% assay) were charged into a round bottom flask equipped with an agitator and thermometer. 70 parts of sodium xylene sulfonate were added to the sulfuric acid with stirring and heating to 65° to 70°C. After holding the solution at this temperature for 1½ hours, 35 parts of crude flavanthrone were added with stirring and the temperature was maintained, with the agitation for 2½ hours. After cooling the contents of the flask to room temperature, the mass was drowned at 0° to 5°C with water and ice and further processed as described in Example 2. The product exhibits essentially the same properties as the product of Example 2.

EXAMPLE 4

The procedure of Example 3 was repeated with the exception that sulfuric acid was used alone and no sodium xylene sulfonate or other aromatic sulfonate was added. The product obtained exhibited a greener yellow shade characteristic of commercial flavanthrones.

X-ray patterns for the products of Examples 1 – 4 were obtained using copper K α radiation. Parafocus geometry was used and the scattered radiation was collected using a curved crystal monochromator preceding the detector. The intensity data is given in the following table, wherein the relative intensity was based on assigning 100 to the strongest peak in a given pattern.

TABLE

| Ex. No. | PROMINENT PEAKS IN dA | | | | | | | | |
|---|---|---|---|---|---|---|---|---|---|
| 1 | 14.32 | 8.09 | 7.14 | | | 3.65 | | 3.40 | |
| 2 | 14.61 | 8.06 | 7.17 | | | 3.64 | | 3.41 | |
| 3 | 14.42 | 8.12 | 7.20 | | | 3.66 | | 3.41 | |
| 4 | 14.03 | 8.12 | 7.34 | 7.00 | 3.72 | 3.67 | 3.52 | 3.39 | 3.31 |

As can be seen from the results illustrated in the above Table the flavanthrones produced by the processes of Examples 1, 2 and 3 are distinctly and noticeably different from the flavanthrone produced by Example 4 which is exemplary of the commercial process for producing flavanthrone. For example, the flavanthrone of Example 4 has 2 prominent peaks between 7.00 and 8.00 dA as opposed to 1 prominent peak in the same range for the flavanthrones of Examples 1, 2 and 3. Likewise, while the flavanthrones of Examples 1, 2 and 3 have only two prominent peaks between 3.30 and 3.75 dA, the flavanthrone of Example 4 has 5 such prominent peaks. It is believed that the X-ray diffraction data given in Table 1 conclusively illustrates that the flavanthrone of the present invention is indeed a new crystalline polymorphic form of flavanthrone. It should be pointed out that while the X-ray diffraction patterns of Examples 1, 2 and 3 are not exactly the same, the differences are so slight as to be insignificant in the identification of the crystalline form, i.e., the readings for Examples 1, 2 and 3 indicate that they are the same crystalline form. These slight variations are most probably due to the preparation of the sample for X-ray diffraction. Also, the variations, being so slight, could be attributable to operator or machine efficiency.

We claim:

1. A process for producing a polymorphic crystalline reddish yellow flavanthrone pigment which exhibits an X-ray diffraction pattern wherein the only prominent peak between 7.00 and 8.00 dA occurs between 7.14 and 7.20 dA, and wherein the only prominent peaks between 3.30 and 3.75 occur between 3.39 and 3.42 dA and between 3.63 and 3.67 dA which comprises treating crude flavanthrone with concentrated nitric acid in an amount between 3 and 10 parts by weight based on the flavanthrone by agitating and maintaining the temperature of the flavanthrone-acid mixture between room temperature and 80°C for about 1 to 3 hours, thereafter drowning the acid mass with water and recovering the flavanthrone so treated.

* * * * *